United States Patent
Kim et al.

(10) Patent No.: US 6,512,503 B1
(45) Date of Patent: Jan. 28, 2003

(54) LIQUID CRYSTAL DISPLAY

(75) Inventors: Hyang Yul Kim, Kyoungki-do (KR); Seung Hee Lee, Kyoungki-do (KR); Won Geon Lee, Seoul (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

(21) Appl. No.: 09/472,637

(22) Filed: Dec. 27, 1999

(30) Foreign Application Priority Data

Dec. 29, 1998 (KR) .............................................. 98-59943

(51) Int. Cl.[7] ................................................. G09G 3/36
(52) U.S. Cl. ........................................ 345/87; 349/141
(58) Field of Search ............................. 345/87, 103, 89, 345/96; 349/33, 139, 141, 142, 143, 144, 147

(56) References Cited

U.S. PATENT DOCUMENTS

| | | | |
|---|---|---|---|
| 4,542,960 A | 9/1985 | Yang | 350/336 |
| 5,175,601 A | 12/1992 | Fitts | 356/376 |
| 5,872,611 A * | 2/1999 | Hirata et al. | 349/147 |
| 5,969,782 A * | 10/1999 | Lee et al. | 349/141 |
| 6,108,058 A * | 8/2000 | Uchida | |
| 6,128,061 A * | 10/2000 | Lee et al. | 349/141 |
| 6,222,599 B1 * | 4/2001 | Yoshida et al. | 349/141 |

FOREIGN PATENT DOCUMENTS

JP     08066362     3/1996     ........... A61B/3/028

* cited by examiner

Primary Examiner—Regina Liang
(74) Attorney, Agent, or Firm—Ladas & Parry

(57) ABSTRACT

The invention discloses a liquid crystal display capable of preventing color shift and also improving response time characteristics. The liquid crystal display comprises: an upper substrate and a lower substrate opposed to each other with a selected distance; a liquid crystal layer sandwiched between the upper and the lower substrate, and having a plurality of liquid crystal molecules; a pixel electrode formed at an inner surface of the lower substrate, wherein a display signal is applied to the pixel electrode; and a counter electrode formed an inner surface of the upper substrate and forming an electric field together with the pixel electrode by applying a common signal, thereby driving the liquid crystal molecules; wherein a voltage difference is occurred between the counter and the pixel electrodes, there are simultaneously formed an electric field disposed vertical to substrate surface and an oblique electric field disposed oblique to substrate surface between the pixel electrode and the counter electrode.

20 Claims, 2 Drawing Sheets

LIQUID CRYSTAL DISPLAY

BACKGROUND OF THE INVENTION

1. Field of the Invention

The invention generally relates to a liquid crystal display, more particularly to a liquid crystal display having enhanced display quality and capable of improving response time characteristics.

2. Description of the Related Art

An in plane switching(hereinafter "IPS") mode liquid crystal display is a device for driving a horizontal electric field developed by Hitachi, Japan in order to compensate viewing angle characteristics of a twisted nematic (hereinafter "TN") mode liquid crystal display.

FIG. 1 is a plane view showing certain part of a sub pixel of the IPS mode liquid crystal display. As shown in FIG. 1, electrode 2a,2b for driving liquid crystal molecules are disposed with a selected distance on the same substrate, for example a lower substrate 1. Herein, the distance between the electrodes 2a,2b is selected such that an electric field is parallel with a surface of the substrate 1. A homogeneous alignment layer(not shown) is formed on the surface of the substrate 1 in which the electrodes 2a,2b are formed. The homogeneous alignment layer is rubbed to make a selected angle, for example approximately ±45° with the electrodes 2a,2b. Furthermore, a first polarizing plate(not shown) having a polarizing axis coincided with the rubbing direction is provided at backside of the lower substrate 1. Meanwhile, an upper substrate(not shown) is arranged opposite to upper portion of the lower substrate 1 with a selected distance. The homogeneous alignment layer is formed at an inner surface of the upper substrate and a second polarizing plate(not shown) perpendicular to the first polarizing plate is formed at an outer surface thereof. A liquid crystal layer(not shown) having liquid crystal molecules 3 is interposed between the lower substrate 1 and the upper substrate(not shown).

Operation of the IPS mode liquid crystal display is as follows.

First of all, when no voltage is applied to the electrodes 2a,2b, long axes of the liquid crystal molecule 3 are disposed parallel with the rubbing axis of the alignment layer. At this time, the polarizing axis of the first polarizing plate is parallel with the rubbing direction, and the polarizing axis of the second polarizing plate is perpendicular to the rubbing direction. Therefore, an incident light transmitted from the backside of the lower substrate 1 can pass the first polarizing plate and the liquid crystal layer, but does not pass the second polarizing plate thereby showing a dark state in the screen.

On the other hand, when a selected voltage is applied to the electrodes 2a,2b, there is formed an electric field E between the electrodes 2a,2b. Herein, since those electrodes 2a,2b are formed at the same substrate surface, the electric field E is parallel to the substrate surface. Therefore, in case of positive dielectric anisotropy, the liquid crystal molecules arranged in a rubbing direction of the alignment layer are twisted along the clockwise direction so that the long axes of the liquid crystal molecules are parallel with the electric field. As a result, the incident light transmitted from the backside of the lower substrate passes through the first polarizing plate, the liquid crystal display and the second polarizing plate since the arrangement of the liquid crystal molecules is changed, thereby showing a white state in the screen.

As known in the art, the refractive anisotropy(or birefringence, Δn) is occurred due to the difference of the lengths of the long and the short axes. The refractive anisotropy Δn is also varied from the viewer's viewing directions. Therefore a predetermined color is appeared on the region where the polar angle is of 0 degree and the azimuth angle range of degrees 0, 90, 180 and 270 in spite of the white state. This phenomenon is regarded as color shift and more detailed description thereof is attached with reference to the equation 1.

$$T \approx T_0 \sin^2(2\chi) \cdot \sin^2(\pi \cdot \Delta n d / \lambda) \qquad \text{equation 1}$$

wherein,

T: transmittance;

$T_0$: transmittance to the reference light;

$\chi$: angle between an optical axis of liquid crystal molecule and a polarizing axis of the polarizing plate;

Δn: birefringence;

d: distance or gap between the upper and lower substrates (thickness of the liquid crystal layer); and λ: wavelength of the incident light.

So as to obtain the maximum transmittance T, the $\chi$ should be $\pi/4$ or the Δnd/λ should be $\pi/2$ according to the equation 1. As the Δnd varies with the birefringence difference of the liquid crystal molecules from viewing directions, the value of λ is varied in order to satisfy $\pi/2$. According to this condition, the color corresponding to the varied wavelength λ appears.

Accordingly, as the value of Δn relatively decreases at viewing direction "x" toward the short axes of the liquid crystal molecules, the wavelength of the incident light for obtaining the maximum transmittance relatively decreases also. Consequently a color of blue having a shorter wavelength than that of a color of white appears.

On the other hand, as the value of Δn relatively increases at a viewing direction "y" toward the long axes of the liquid crystal molecules, the wavelength of an incident light relatively increases also.

Consequently a color of yellow having a longer wavelength than that of the color of white appears.

Deterioration is caused in the picture quality of IPS mode liquid crystal display.

Furthermore, since no electrode is formed at the upper substrate of the foregoing IPS mode liquid crystal display, the response time thereof is slower than that of the TN mode liquid crystal display, and it is also difficult to remove the static electricity generated at the upper substrate.

SUMMARY OF THE INVENTION

Accordingly, one object of the present invention is to provide a liquid crystal display capable of improving picture quality by preventing color shift.

Further, the other object of the invention is to provide a liquid crystal display capable of improving response time characteristics.

One another object of the invention is to provide a liquid crystal display capable of easily discharging the static electricity generated at an upper substrate of the same.

In order to accomplish these objects, the invention provides a liquid crystal display comprises:

an upper substrate and a lower substrate opposed to each other with a selected distance;

a liquid crystal layer sandwiched between the upper and the lower substrate, and having a plurality of liquid crystal molecules;

a pixel electrode formed at an inner surface of the lower substrate, wherein a display signal is applied to the pixel electrode; and a counter electrode formed an inner surface of the upper substrate and forming an electric field together with the pixel electrode by applying a common signal, thereby driving the liquid crystal molecules;

wherein a voltage difference is occurred between the counter and the pixel electrodes, there are simultaneously formed an electric field disposed vertical to substrate surface and an oblique electric field disposed oblique to substrate surface between the pixel electrode and the counter electrode.

Furthermore, the invention provides a liquid crystal display comprising:

an upper substrate and a lower substrate opposed to each other with a selected distance, in which sub pixels are defined respectively;

a liquid crystal layer sandwiched between the upper and the lower substrates, and having a plurality of liquid crystal molecules having negative dielectric anisotropy;

a pixel electrode formed at an inner surface of the lower substrate and made of a transparent material, wherein a display signal is applied to the pixel electrode; and a counter electrode formed at an inner surface of the upper substrate, made of a transparent material and forming an electric field together with the pixel electrode by applying a common signal, thereby driving the liquid crystal molecules;

wherein no voltage difference is occurred between the counter and the pixel electrodes, long axes of the liquid crystal molecules are aligned vertical to substrate surface;

wherein a voltage difference is occurred between the counter and the pixel electrodes, there are simultaneously formed an electric field disposed vertical to substrate surface and an oblique electric field disposed oblique to substrate surface between the pixel electrode and the counter electrodes.

The invention still provides a liquid crystal display comprising:

an upper substrate and a lower substrate opposed to each other with a selected distance;

gate bus lines and data bus lines arranged in a matrix type and defining sub pixels;

a storage electrode disposed at each sub pixel of the lower substrate;

a pixel electrode overlapped with a selected portion of the storage electrode, disposed at each sub pixel of the lower substrate and made of a transparent conductive material;

a counter electrode disposed at each sub pixel of the upper substrate and made of a transparent conductive material; and homeotropic alignment layers disposed at a surface of the pixel electrode and the lower substrate, and at a surface of the counter electrode and the upper substrate, wherein the storage electrode comprises a first region extended along a width direction of the sub pixel and dividing the sub pixel region in two; a second region disposed parallel with the first region and adjacent to the corresponding gate bus lines; and a third region connecting the first and the second regions and disposed adjacent to the corresponding data bus line, wherein the pixel electrode comprises a body overlapped with the third region of the storage electrode and extended along a length direction of the sub pixel; a protruding part extended from the body to a space between the first region and the second region; and a plurality of teeth of comb formed at one side of the protruding part and at the sub pixel region of one side of the protruding part, and extended parallel with the first region of the storage electrode from the body, wherein the counter electrode further comprises a first electrode part formed along a length direction of the sub pixel to correspond with the body of the pixel electrode; a second electrode part to correspond with the protruding part of the pixel electrode and extended from the first electrode part to occupy certain region of the sub pixel; and a third electrode part extended from the first and the second electrode parts and disposed on the upper substrate to correspond with spaces between the teeth of comb of the pixel electrode.

DESCRIPTION OF THE PREFERRED EMBODIMENTS

Hereinafter, descriptions of the preferred embodiment of the present invention will be followed with reference to the attached drawings.

Figure 1:
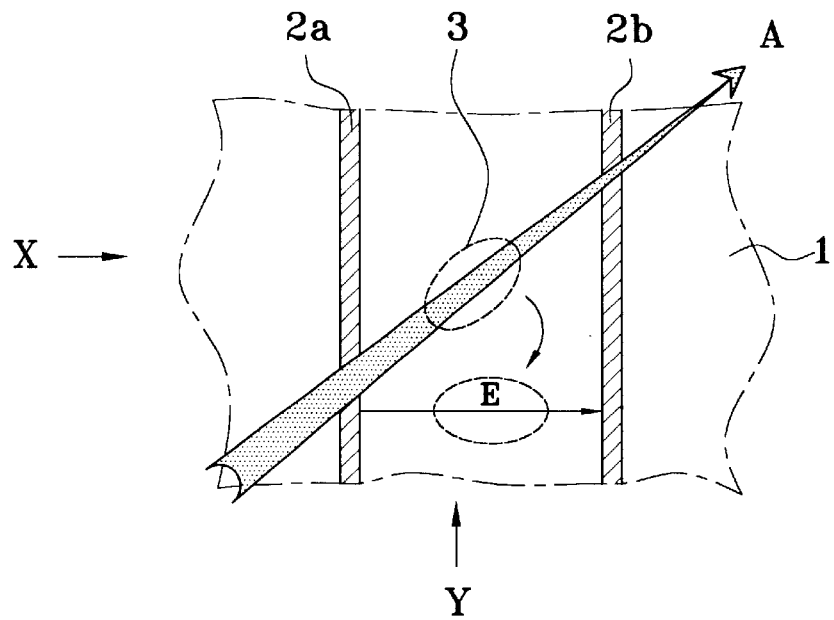
FIG. 1 illustrates the operation principle of a conventional IPS mode liquid crystal display.
Figure 2:
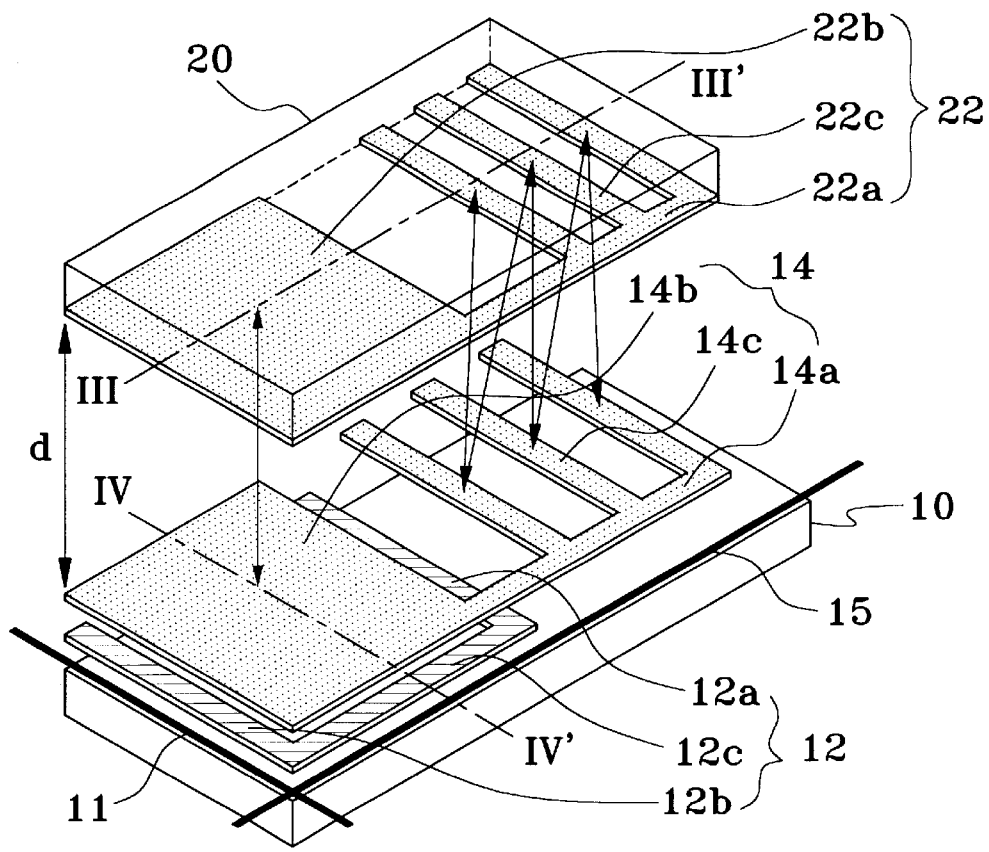
FIG. 2 is a perspective view showing a liquid crystal display having wide viewing angle according to the present invention.

Referring to FIG. 2, a lower substrate 10 and an upper substrate 20 are arranged opposite to each other with a selected distance.

On a surface of the lower substrate 10, a plurality of gate bus lines and a plurality of data bus line are arranged in a matrix thereby defining sub pixels.

On a surface of the lower substrate 10, a storage electrode 12 made of an opaque metal, for example an MoW metal layer or an Mo/Al stacking layer is formed at the same time the gate bus lines 11 are formed. Herein, the storage electrode 12 includes a first region 12a traversing inside the sub pixel along the direction parallel with the gate bus line 11, a second region 12b parallel to the first region 12a and extended adjacent to the gate bus line 11, and a third region 12c connecting the first region 12a and the second region 12b. At this time, the third region 12c is perpendicular to the first and the second regions 12a,12b, and is disposed adjacent to the data bus line 15. Herein, the first to the third regions 12a,12b,12c of the storage electrode 12 have a selected width.

A pixel electrode 14 made of an ITO material is formed on the sub pixel in which the storage electrode 12 is formed. The pixel electrode 14 includes a body 14a overlapped with the third region 12c of the storage electrode 12 and extended along a length direction of the sub pixel, a protruding part 14b protruded from the body 1a between the first and the second regions 12a,12b of the storage electrode 12 protruded from the body 14a, and a plurality of teeth of comb 14c extended parallel to the first region 12a from the body 14a between the first region 12a of the storage electrode 12 and a previous gate bus line(not shown). Herein, widths of the teeth of comb 14c are narrower than that of the protruding part 14b, and the teeth of comb 14c are disposed with a predetermined distance.

Figure 3:
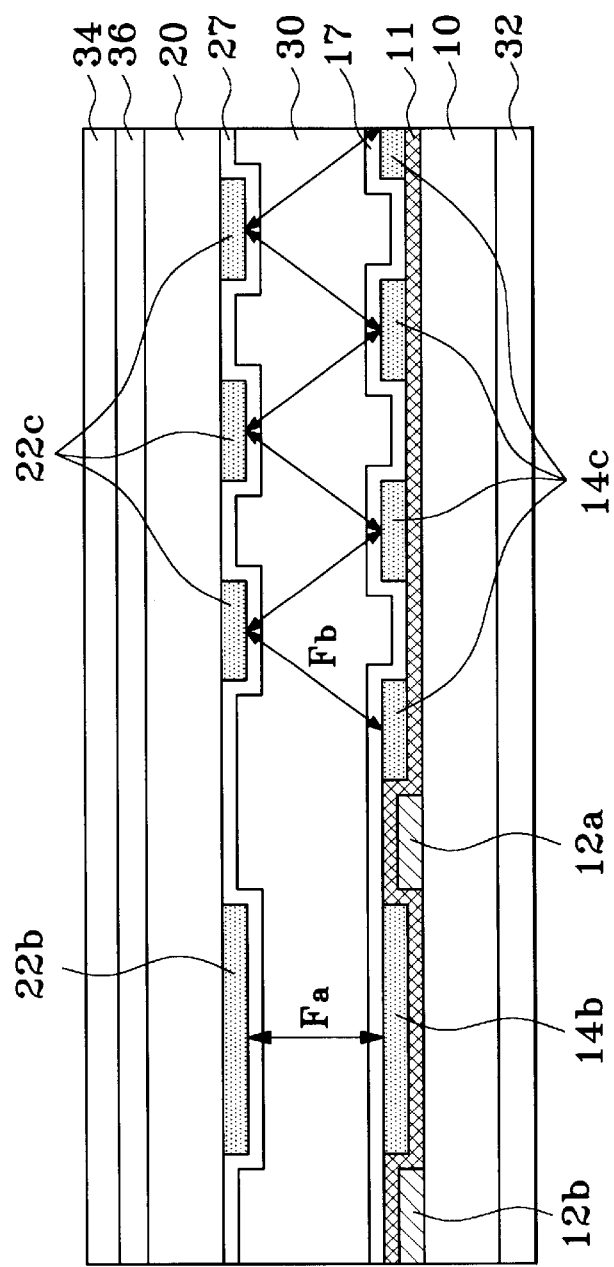
FIG. 3 is a cross-sectional view taken along the line III–III' of FIG. 2.
Figure 4:
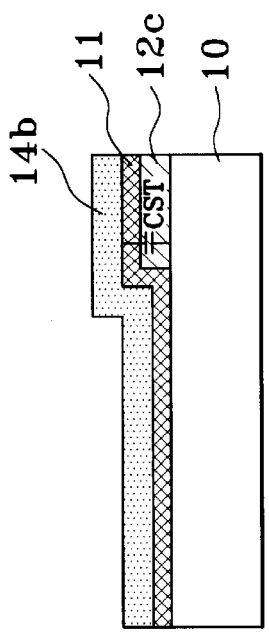
FIG. 4 is a cross-sectional view taken along the line IV–IV' of FIG. 2.

At this time, when the sub pixel is viewed from the length direction of the sub pixel, the protruding part 14b is disposed at a space between the first and the second regions 12a, 12b as shown in FIG. 3. Meanwhile, when the sub pixel is viewed from the width direction of the sub pixel, the protruding part 14b is overlapped with the third region 12c thereby forming an auxiliary capacitance Cst as shown in FIG. 4.

A black matrix(not shown) and a color filter(not shown) are formed at an inner surface of the upper substrate 20. On surfaces of the black matrix and the color filter, a counter electrode 22 made of the ITO material is formed to generate an electric field together with the pixel electrode 14. At this time, the counter electrode 22 has a similar structure as the pixel electrode 14. Namely, the counter electrode 22 includes a first electrode part 22a extended along the length direction of the sub pixel, a second electrode part 22b extended from the first electrode part 22a and having a similar shape as the protruding part 14b of the pixel electrode 14, and a third electrode part 22c parallel with the second electrode part 22b and formed at each portion corresponding to the space between the teeth of comb 14c of the pixel electrode 14. Herein, the first electrode part 22a is disposed to correspond with the body 14a of the pixel electrode 14 and the second electrode part 22b is disposed to correspond with the protruding part 14b of the pixel electrode 14. Meanwhile, the third electrode part 22c as described above is disposed to correspond with the spaces between the teeth of comb 14c.

Homeotropic alignment layers 17,27 are formed at a surface of a resultant of the lower substrate 10 and the upper substrate 20, and a liquid crystal layer 30 of negative dielectric anisotropy is sandwiched between the lower substrate 10 and the upper substrate 20.

A first polarizing plate 32 is disposed at an outer surface of the lower substrate 10, and a second polarizing plate 34 is disposed at an outer surface of the upper substrate 20. These first and second polarizing plates 32,34 have polarizing axes respectively and those axes are perpendicular to each other. Herein, the polarizing axis of the first polarizing plate 32 makes a selected angle, for example approximately ±20°~60° more preferably ±45° with the gate bus line 11 or the data bus line 15.

Further, a phase compensation plate 36 is interposed between the outer surface of the upper substrate 20 and the second polarizing plate 34 so as to compensate the refractive anisotropy of liquid crystal molecules. The phase compensation plate 36 has a phase retardation value(a product of the refractive anisotropy $\Delta n$ of liquid crystal molecules and thickness d of liquid crystal layer) equal to an absolute value of that of the liquid crystal layer 30. Herein, the phase retardation value of the liquid crystal layer 30 is preferably 0.2–0.7 $\mu$m in the present embodiment.

Operation of the liquid crystal display having the foregoing constitutions is as follows.

First of all, when no electric field is formed at the pixel electrode 14 and the counter electrode 22, long axes of the liquid crystal molecules(not shown) in the liquid crystal layer 30 are arranged perpendicular to surfaces of the substrates due to the influence of the homeotropic alignment layers 17,27. Consequently, an incident light passed through the first polarizing plate 32 passes the liquid crystal layer 30, but can not pass the second polarizing plate 34, thereby showing a dark state in the screen. At this time, since the phase compensation plate 36 is arranged at the outer surface of the upper substrate 20, the refractive anisotropy of liquid crystal molecules is compensated thereby showing a complete dark state at anywhere in the screen.

Meanwhile, when a voltage difference is occurred between the pixel electrode 14 and the counter electrode 22, there is formed a linear electric field Fa that is vertically disposed with respect to the-substrate surfaces, between the protruding part 14b of the pixel electrode 14 and the second electrode part 22b of the counter electrode 22. On the other hand, an oblique electric field Fb that is disposed diagonal to the substrate surface between the teeth of comb 14c of the pixel electrode 14 and the third electrode part 22c of the counter electrode 22. Herein, the oblique electric field Fb is fringe field type since the distance between the teeth of comb 14c of the pixel electrode 14 and the third-electrode part 22c of the counter electrode 22 is fine enough.

The liquid crystal molecules are arranged vertical to the electric fields Fa and Fb. At an edge portion of the protruding part 14b of the pixel electrode 14, a parasitic electric field is formed between the protruding part 14b and the first and the second regions 12a, 12b of the storage electrode 12. The parasitic electric field distorts the linear electric field Fa. However, the parasitic electric field does not abnormally arrange the liquid crystal molecules, and rather it helps to start the liquid crystal molecules of negative dielectric anisotropy to be arranged vertical to the electric field.

Accordingly, since the linear electric field Fa and the oblique electric field Fb are formed within a sub pixel simultaneously, there are formed electric fields of three directions in the liquid crystal layer 30.

As a result, when the long axes of the liquid crystal molecules are arranged perpendicular to the electric fields, an incident light passed the first polarizing plate 32 changes its polarizing state while passing the liquid crystal layer 30, thereby passing the second polarizing plate 34. Therefore, the white state is shown in the screen.

At this time, according to the electric fields of three directions, there is formed a multi-domain in a sub pixel. That is to say, a liquid crystal domain arranged almost parallel to the substrate surfaces is formed at a region where the linear electric field is formed. A domain making approximately ±45° with respect to the substrate surface and another domain making −45° with respect to the substrate surface are formed at regions where the oblique electric field is formed respectively. As a result, the refractive anisotropy of liquid crystal molecules is compensated. In other words, long and short axes of the liquid crystal molecules are all shown at anywhere in the screen, thereby preventing color shift.

Further, since the homeotropic alignment layer itself has a faster respond time characteristic than that of the homogeneous alignment layer, the liquid crystal display of the present embodiment has a superior response time characteristic to the conventional IPS mode liquid crystal display.

Moreover, the counter electrode and the pixel electrode are all made of ITO material thereby improving the aperture ratio.

As the oblique electric field is formed, the short axis of the liquid crystal molecules makes 45° with the polarizing axis of the polarizing plate thereby obtaining the maximum transmittance and leaking light. Furthermore, the counter electrode is formed at the substrate, thereby easily discharging the static electricity generated at the upper substrate.

While the present invention has been described with reference to certain preferred embodiment, various other modifications will be apparent to and can be readily made by those skilled in the art without departing from the scope and spirit of the present invention.

What is claimed is:

1. A liquid crystal display comprising:
   an upper substrate and a lower substrate, each of which has an inner surface facing the other inner surface in a substantially parallel manner;
   a liquid crystal layer having liquid crystal molecules being sandwiched between the inner surfaces of the upper and the lower substrates;
   a pixel electrode formed on the inner surface of the lower substrate for receiving a display signal; and
   a counter electrode formed on the inner surface of the upper substrate for receiving a common signal,
   wherein a voltage difference between the counter electrode and the pixel electrode simultaneously produces a first electric field running substantially normal to and between the two inner surfaces of the upper and lower substrates and a second electric field running substantially oblique to and between the two inner surfaces of the upper and lower substrates.

2. The liquid crystal display of claim 1, wherein the pixel electrode and the counter electrode are made of a transparent conductive material.

3. The liquid crystal display of claim 2, wherein the transparent conductive material is ITO material.

4. The liquid crystal display of claim 1, further comprising homeotropic alignment layers at inner surfaces of the upper and the lower substrates respectively.

5. The liquid crystal display of claim 4, wherein the liquid crystal molecules in the liquid crystal layer have negative dielectric anisotropy.

6. A liquid crystal display comprising:
   an upper substrate and a lower substrate, each of which has an inner surface facing the other inner surface in a substantially parallel manner, wherein sub pixels are defined in the upper and lower substrates;
   a liquid crystal layer having liquid crystal molecules of negative dielectric anisotropy being sandwiched between the inner surfaces of the upper and the lower substrates;
   a pixel electrode made of a transparent material being formed on the inner surface of the lower substrate for receiving a display signal; and
   a counter electrode made of a transparent material being formed on the inner surface of the upper substrate for receiving a common signal;
   wherein substantially no difference in voltage between the counter electrode and the pixel electrode produces long axes of the liquid crystal molecules to align in a direction normal to the substrate inner surfaces, and
   wherein a voltage difference between the counter electrode and the pixel electrode simultaneously produces a first electric field running substantially normal to and between the substrate inner surfaces and a second electric field running oblique to and between the substrate inner surfaces.

7. The liquid crystal display of claim 6, wherein the pixel electrode further comprises a body extended along a length direction of sub pixel, a protruding part extended from the body and protruded to occupy a region of the sub pixel, and at least a teeth of comb formed at the other region of the sub pixel and extended along a width direction of sub pixel, wherein the counter electrode further comprises a first electrode part to correspond with the body of the pixel electrode, a second electrode part to correspond with the protruding part of the pixel electrode and extended from the first electrode part to occupy certain region of the sub pixel, and a third electrode part extended from the first and the second electrode parts and disposed on the upper substrate to correspond with spaces between the teeth of comb of the pixel electrode.

8. The liquid crystal display of claim 7, wherein the pixel electrode and the counter electrode are made of ITO material.

9. The liquid crystal display of claim 7, further comprising a storage electrode disposed between the surface of the lower substrate and the pixel electrode, and surrounding an outer portion of the protruding part.

10. The liquid crystal display of claim 6, further comprising a first polarizing plate having a polarizing axis of a selected direction at an outer surface of the lower substrate, and a second polarizing plate having a polarizing axis of a direction vertical to that of the first polarizing plate at an outer surface of the upper substrate.

11. The liquid crystal display of claim 10, wherein the polarizing axis of the first polarizing plate makes approximately either +20° to +60° or −20° to −60° with respect to the width or length of the sub pixel.

12. The liquid crystal display of claim 10, further comprising a phase compensation plate between the upper substrate and the second polarizing plate.

13. The liquid crystal display of claim 12, wherein a phase retardation value of the phase compensation plate is equal to the absolute value of that of the liquid crystal layer.

14. The liquid crystal display of claim 13, wherein the phase retardation value of the phase compensation plate and the liquid crystal layer is in range of 0.2 $\mu$m to 0.7 $\mu$m.

15. A liquid crystal display comprising:
   an upper substrate and a lower substrate, each of which has an inner surface facing the other inner surface in a substantially parallel manner;
   gate bus lines and data bus lines arranged in a matrix type and defining sub pixels upper and lower substrates;
   a storage electrode formed at each sub pixel of the lower substrate,
      wherein the storage electrode comprises a first region extended along a width direction of the sub pixel and dividing the sub pixel region in two; a second region disposed parallel with the first region and adjacent to the corresponding gate bus lines; and a third region connecting the first and the second regions and disposed adjacent to the corresponding data bus line;
   a pixel electrode made of a transparent conductive material formed at each sub pixel of the lower substrate, the pixel electrode overlapping a portion of the storage electrode,
      wherein the pixel electrode comprises a body overlapped with the third region of the storage electrode and extended along a length direction of the sub pixel; a protruding part extended from the body to a space between the first region and the second region; and a plurality of teeth of comb formed at one side of the protruding part and at the sub pixel region of one side of the protruding part, and extended parallel with the first region of the storage electrode from the body;
   a counter electrode made of a transparent conductive material formed at each sub pixel of the upper substrate, wherein the counter electrode further comprises a first electrode part formed along a length direction of the sub pixel to correspond with the body of the electrode; a second electrode part to correspond with the protruding part of the pixel electrode and extended from the first electrode part to occupy certain region of the sub pixel; and a third electrode part extended from the first and the second electrode parts and disposed on the upper substrate to correspond with spaces between the teeth of comb of the pixel electrode; and homeotropic alignment layers formed on the pixel and counter electrodes and on both inner surfaces of the upper and lower substrates.

16. The liquid crystal display of claim 15, wherein the pixel electrode and the counter electrode are made of ITO material.

17. The liquid crystal display of claim 15, further comprising a first polarizing plate having a polarizing axis of a selected direction at an outer surface of the lower substrate, and a second polarizing plate having a polarizing axis of a direction vertical to that of the first polarizing plate at an outer surface of the upper substrate.

18. The liquid crystal display of claim 15, wherein the polarizing axis of the first polarizing plate makes approximately either +20° to +60° to −20° to −60° with respect to the width or length of the sub pixel.

19. The liquid crystal display of claim 15, further comprising a phase retardation value of the phase compensation plate is equal to the absolute value of that of the liquid crystal layer.

20. The liquid crystal display of claim 19, where in the phase retardation value of the phase compensation plate and the liquid crystal layer is in range 0.2 $\mu$m to 0.7 $\mu$m.

* * * * *